(12) United States Patent
Johnson et al.

(10) Patent No.: US 10,229,776 B2
(45) Date of Patent: Mar. 12, 2019

(54) MULTI-PHASE MAGNETIC COMPONENT AND METHOD OF FORMING

(71) Applicant: General Electric Company, Schenectady, NY (US)

(72) Inventors: Francis Johnson, Clifton Park, NY (US); Min Zou, Niskayuna, NY (US); Patel Bhageerath Reddy, Niskayuna, NY (US); James Pellegrino Alexander, Ballston Lake, NY (US); Ayman Mohamed Fawzi EL-Refaie, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 149 days.

(21) Appl. No.: 15/078,439

(22) Filed: Mar. 23, 2016

(65) Prior Publication Data

US 2016/0203898 A1    Jul. 14, 2016

Related U.S. Application Data

(63) Continuation-in-part of application No. 14/068,937, filed on Oct. 31, 2013, now Pat. No. 9,634,549.

(51) Int. Cl.
*H02K 19/02* (2006.01)
*H01F 1/147* (2006.01)
(Continued)

(52) U.S. Cl.
CPC .............. *H01F 7/021* (2013.01); *B05D 7/14* (2013.01); *C21D 8/1255* (2013.01);
(Continued)

(58) Field of Classification Search
CPC ............ H02K 1/02; H02K 1/246; H02K 19/02
(Continued)

(56) References Cited

U.S. PATENT DOCUMENTS

| 4,121,953 A | 10/1978 | Hull |
| 4,916,027 A | 4/1990 | Delmundo |

(Continued)

FOREIGN PATENT DOCUMENTS

| CN | 101645628 A | 2/2010 |
| JP | H0636664 B2 | 5/1994 |

(Continued)

OTHER PUBLICATIONS

J.W.Simmons, "Overview: High-Nitrogen Alloying of Stainless Steels", Materials Science and Engineering, Mar. 30, 1996, vol. 207, Issue 2, pp. 159-169.

(Continued)

*Primary Examiner* — John K Kim
(74) *Attorney, Agent, or Firm* — GE Global Patent Operation; Nitin N. Joshi

(57) ABSTRACT

A magnetic component including first and second regions, and a method of varying the magnetization values in different regions of the magnetic component are disclosed. The first and the second regions are characterized by a nitrogen content that is different from each other. At least one of the first region and the second region is partially-magnetic and has a nitrogen content in a range from about 0.1 weight % to about 0.4 weight % of that region. A concentration of carbon, if present, of both the first and second regions is less than about 0.05 weight % of the respective regions.

5 Claims, 5 Drawing Sheets

(51) Int. Cl.

| | |
|---|---|
| *H01F 7/02* | (2006.01) |
| *H01F 41/02* | (2006.01) |
| *B05D 7/14* | (2006.01) |
| *C23C 8/04* | (2006.01) |
| *C23C 8/26* | (2006.01) |
| *H02K 1/02* | (2006.01) |
| *H02K 1/24* | (2006.01) |
| *C21D 8/12* | (2006.01) |
| *C22C 38/04* | (2006.01) |
| *C22C 38/30* | (2006.01) |
| *C22C 38/38* | (2006.01) |
| *C21D 1/26* | (2006.01) |

(52) U.S. Cl.
CPC .......... *C21D 8/1277* (2013.01); *C22C 38/04* (2013.01); *C22C 38/30* (2013.01); *C22C 38/38* (2013.01); *C23C 8/04* (2013.01); *C23C 8/26* (2013.01); *H01F 1/147* (2013.01); *H01F 41/0253* (2013.01); *H02K 1/02* (2013.01); *H02K 1/246* (2013.01); *H02K 19/02* (2013.01); *C21D 1/26* (2013.01); *C21D 2221/00* (2013.01)

(58) Field of Classification Search
USPC ........................................... 310/46, 216.075
IPC ................................................ H01F 7/02, 41/02
See application file for complete search history.

(56) References Cited

U.S. PATENT DOCUMENTS

| | | | |
|---|---|---|---|
| 5,818,140 A | 10/1998 | Vagati | |
| 6,080,245 A * | 6/2000 | Uchida | B22F 9/04 148/103 |
| 6,245,441 B1 | 6/2001 | Yokoyama et al. | |
| 6,255,005 B1 * | 7/2001 | Yokoyama | C21D 6/004 148/120 |
| 6,468,365 B1 * | 10/2002 | Uchida | H01F 1/0577 148/302 |
| 6,664,696 B1 | 12/2003 | Pham et al. | |
| 7,696,662 B2 * | 4/2010 | Komuro | B82Y 10/00 148/101 |
| 7,846,271 B2 | 12/2010 | Choi et al. | |
| 9,634,549 B2 * | 4/2017 | Dial | H01F 1/147 |
| 9,803,139 B1 | 10/2017 | Bonitatibus, Jr. et al. | |
| 2012/0021917 A1 * | 1/2012 | Sakamoto | C21D 6/004 505/230 |
| 2012/0040840 A1 | 2/2012 | Okayama et al. | |
| 2012/0288396 A1 * | 11/2012 | Lee | C22C 38/04 420/74 |
| 2012/0315180 A1 | 12/2012 | Soderman et al. | |
| 2012/0328467 A1 * | 12/2012 | Fernandez Acevedo | B22F 9/08 420/83 |
| 2014/0001906 A1 | 1/2014 | Li et al. | |
| 2014/0062247 A1 | 3/2014 | Dorfner et al. | |
| 2014/0239763 A1 | 8/2014 | Raminosoa et al. | |
| 2014/0265708 A1 | 9/2014 | Galioto et al. | |
| 2015/0054380 A1 | 2/2015 | Suzuki | |
| 2015/0115749 A1 | 4/2015 | Dial et al. | |
| 2016/0203898 A1 * | 7/2016 | Johnson | H01F 7/021 335/302 |
| 2018/0183279 A1 * | 6/2018 | Kool | H02K 1/04 |

FOREIGN PATENT DOCUMENTS

| | | |
|---|---|---|
| JP | 2000312446 A | 11/2000 |
| JP | 2002180215 A | 6/2002 |
| JP | 2008099360 A | 4/2008 |
| JP | 2015053823 A | 3/2015 |
| WO | 2008009706 A1 | 1/2008 |

OTHER PUBLICATIONS

Mita et al., "Magnetic Screw Rod Using Dual State 0.6C—13Cr—Fe Bulk Magnetic Material", Journal of Applied Physics, May 15, 2002, vol. 91, Issue 10, 4 Pages.

André Paulo Tschiptschin., "Predicting Microstructure Development During High Temperature of Martensitic Stainless Steels Using Thermodynamic Modeling", Materials Research, http://www.scielo.br/pdf/mr/v5n3/v5n3a06, vol. 5, Issue 3, 2002, pp. 257-262.

Mita et al., "Study of Internal Permanent Magnet Rotor Made of 0.6C—13Cr—Fe Dual State Magnetic Material", Journal of Applied Physics, May 15, 2003, vol. 93, No. 10, 4 Pages.

Mita et al., "A Study of Retainer Ring Made of 13.5Cr—0.6C—Fe Dual State Magnetic Material", Journal of Magnetism and Magnetic Materials, Jan. 2003, vols. 254-255, pp. 272-274.

Ju Hwan Oh et al., "New rotor shape design of SRM to reduce the torque ripple and improve the output power", Electrical Machines and Systems, 2005. ICEMS 2005. Proceedings of the Eighth International Conference on, vol. 1, Sep. 27-29, 2005, pp. 652-654.

Putatundaa et al., "Mechanical and Magnetic Properties of a New Austenitic Structural Steel", Materials Science and Engineering: A, http://www.sciencedirect.com/science/article/pii/S0921509305006489, vol. 406, Issue 1-2, Oct. 15, 2005, pp. 254-260.

Czerwiec et al., "Fundamental and Innovations in Plasma Assisted Diffusion of Nitrogen and Carbon in Austenitic Stainless Steels and Related Alloys", Plasma Processes and Polymers, Jul. 18, 2009, vol. 6, Issue 6-7, pp. 401-409.

Rudnizki et al., "Phase-Field Modeling of Austenite Formation from a Ferrite plus Pearlite Microstructure during Annealing of Cold-Rolled Dual-Phase Steel", Metallurgical & Materials Transactions, Aug. 2011, vol. 42, Issue 8, pp. 2516-2525.

Wan et al., "Analysis of Magnetism in High Nitrogen Austenitic Stainless Steel and Its Elimination by High Temperature Gas Nitriding", J. Mater. Sci. Technol, http://www.researchgate.netpublication/235666841_Analysis_of_Magnetism_in_High_Nitrogen_Austenitic_Stainless_Steel_and_Its_Elimination_by_High_Temperature_Gas_Nitriding, vol. 27, Issue 12, 2011, pp. 1139-1142.

Ghasaei et al., "Torque ripple reduction by multi-layering technique in an interior permanent magnet motor used in hybrid electric vehicle", Power Electronics, Electrical Drives, Automation and Motion (SPEEDAM), 2014 International Symposium on, Jun. 18-20, 2014, Ischia, pp. 372-377.

Search Report and Written Opinion from corresponding EP Application No. 17162234.3 dated Mar. 22, 2017, 6 Pages.

* cited by examiner

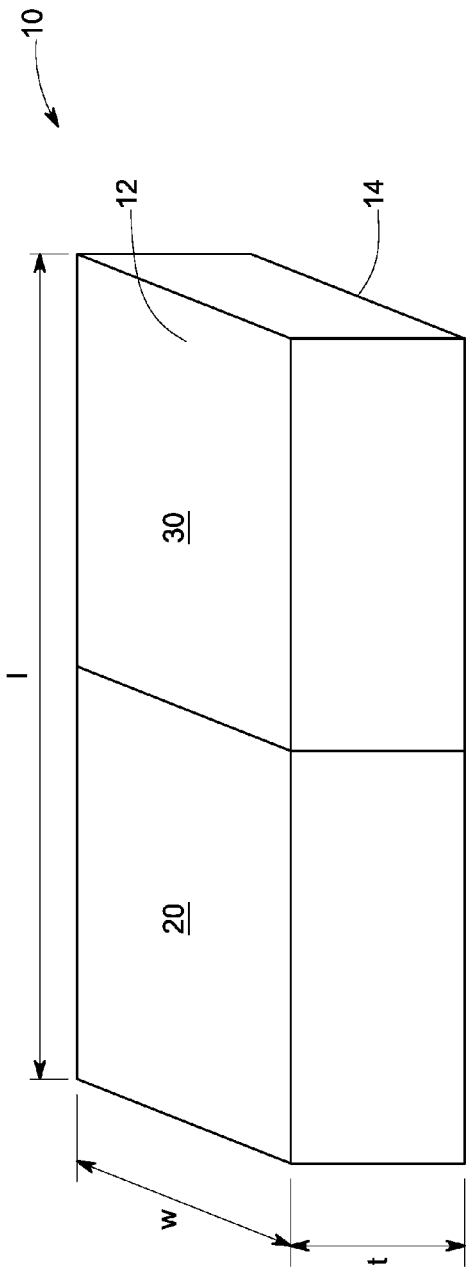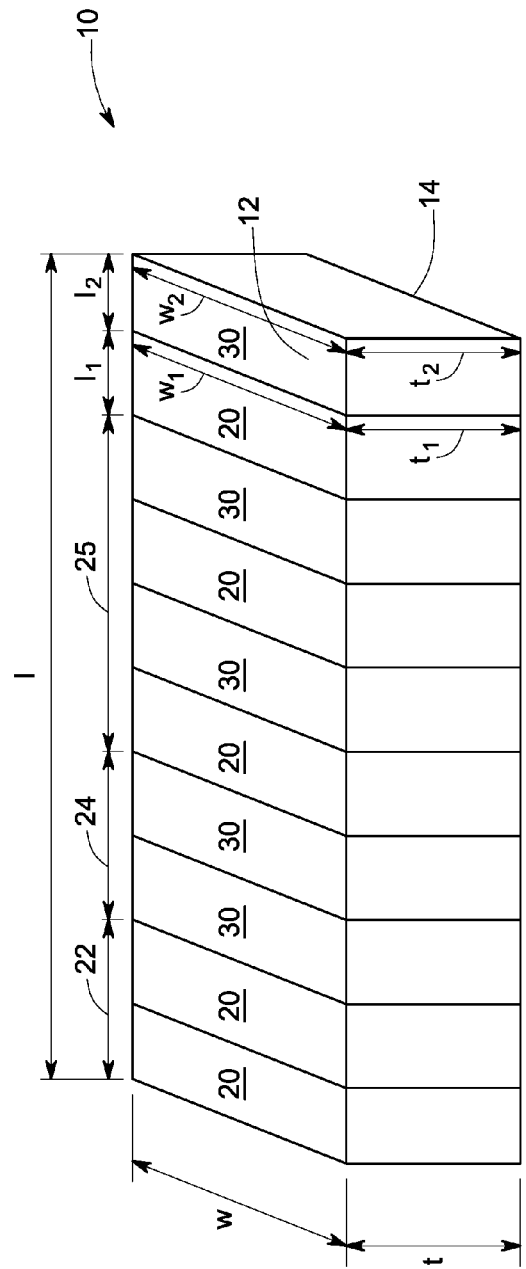
FIG. 1
FIG. 2

MULTI-PHASE MAGNETIC COMPONENT AND METHOD OF FORMING

CROSS-REFERENCE TO RELATED APPLICATIONS

This application is a continuation-in-part of the co-pending U.S. patent application Ser. No. 14/068,937, entitled "DUAL PHASE MAGNETIC MATERIAL COMPONENT AND METHOD OF FORMING" filed on 31 Oct. 2013.

STATEMENT REGARDING FEDERALLY SPONSORED RESEARCH & DEVELOPMENT

This invention was made with Government support under contract number DE-EE0005573, awarded by the United States Department of Energy. The Government has certain rights in the invention.

BACKGROUND

Embodiments of the present disclosure relate generally to a magnetic component including multiple regions, and a method of forming the same. More particularly, the disclosure relates to a magnetic component having multiple regions with different nitrogen content, and formation of the same by nitriding.

The need for high power density and high efficiency electrical machines, such as, for example, electric motors and generators has long been prevalent for a variety of applications, particularly for hybrid and/or electric vehicle traction applications. The current trend in hybrid/electric vehicle traction motor applications is to increase rotational speeds to increase the machine's power density, and hence reduce its mass and cost. However, it is recognized that when electrical machines are used for traction applications in hybrid/electric vehicles, there is a tradeoff between power density, efficiency, and the machine's constant power speed range. This tradeoff may present numerous design challenges.

Specifically, magnetic materials used in rotating electric machines generally serve multiple functions. Efficient coupling of magnetic fluxes to complementary poles across an air gap in the electric machines are desirable. Soft magnetic materials of the magnetic components may also bear a significant fraction of the mechanical and structural loads of the electric machine. Sometimes there may be tradeoffs between efficient magnetic utilization of the material and mechanical load bearing capability of the magnetic materials. Alternatively, sometimes speed rating of a machine may be lowered in order to allow a machine topology with efficient magnetic utilization. Therefore, it is desirable to have a material that can avoid the trade-offs between efficiency and operability of the electric machines by locally controlling the magnitude of the saturation magnetization of the soft magnetic material used in electric machines.

The power density of an electric machine may be increased by increasing the machine size, improving thermal management, increasing rotor speed, or by increasing the magnetic utilization. The magnetic utilization may be increased by using a combination of processing and alloying of a rotor lamination to create a multi-phase magnetic material by developing localized areas of high and low permeability. The localized areas of high and low permeability generally reduce flux losses during rotor operation.

A range of ferrous based soft magnetic compositions of the rotor lamination may be austenitized by a combination of processes to form regions of low permeability. This phase transformation at selected regions is normally thermally driven in the presence of carbides in the alloy. Upon local heating, the carbides that are present at selected locations dissolve in the matrix and depress the martensite start temperature, thereby aiding the stabilization of austenite regions at room temperature. However, the presence of carbides in a magnetic microstructure is known to increase coercivity and to lower the magnetic saturation, as compared to traditional ferrous-based magnetic steels. A different method of controlling the stabilization of the austenite phase at room temperature in different regions of the soft magnet, while starting from a substantially single phase microstructure, is desired to decrease the coercivity. Embodiments of the present disclosure address these and other needs.

BRIEF DESCRIPTION

In accordance with one aspect of the disclosure, a magnetic component including a first region and a second region is disclosed. The first region and the second region are characterized by a nitrogen content that is different from each other. At least one of the first region and the second region is partially-magnetic and has a nitrogen content in a range from about 0.1 weight % to about 0.4 weight % of that region. Both the first and second regions have a concentration of carbon, if present, that is less than 0.05 weight % of the respective regions.

In accordance with one aspect of the disclosure, a magnetic component including a first region, a second region, and a third region is disclosed. The first region includes a magnetic phase, the second region includes a partially-magnetic phase, and the third region includes a non-magnetic phase. The first region has a nitrogen content less than 0.1 weight % of the first region, the second region has a nitrogen content in a range from about 0.1 weight % to about 0.4 weight % of the second region, and the third region has a nitrogen content greater than 0.4 weight % of the third region. Further, a concentration of carbon in the first, second, and third regions is less than 0.05 weight % of the respective regions.

In accordance with another aspect of the disclosure, a method for varying the magnetization values in different regions of a magnetic component is disclosed. The method includes disposing a coating that includes a nitrogen stop-off material on at least one portion of the magnetic component to form a mask and heat-treating the magnetic component in a nitrogen-rich atmosphere at a temperature greater than 700° C. to form a first region and a second region. The first region and the second region are characterized by a nitrogen content that is different from each other, and at least one of the first and second region is partially-magnetic and has a nitrogen content in a range from about 0.1 weight % to about 0.4 weight % of that region.

BRIEF DESCRIPTION OF THE DRAWINGS

These and other features, aspects, and advantages of the present disclosure will become better understood when the following detailed description is read with reference to the accompanying drawings, in which like characters represent like parts throughout the drawings, wherein:

FIG. 1 illustrates a magnetic component including first and second regions, in accordance with some embodiments;

FIG. 2 illustrates a magnetic component including multiple first and second regions, in accordance with some embodiments;

DETAILED DESCRIPTION

Figure 3:
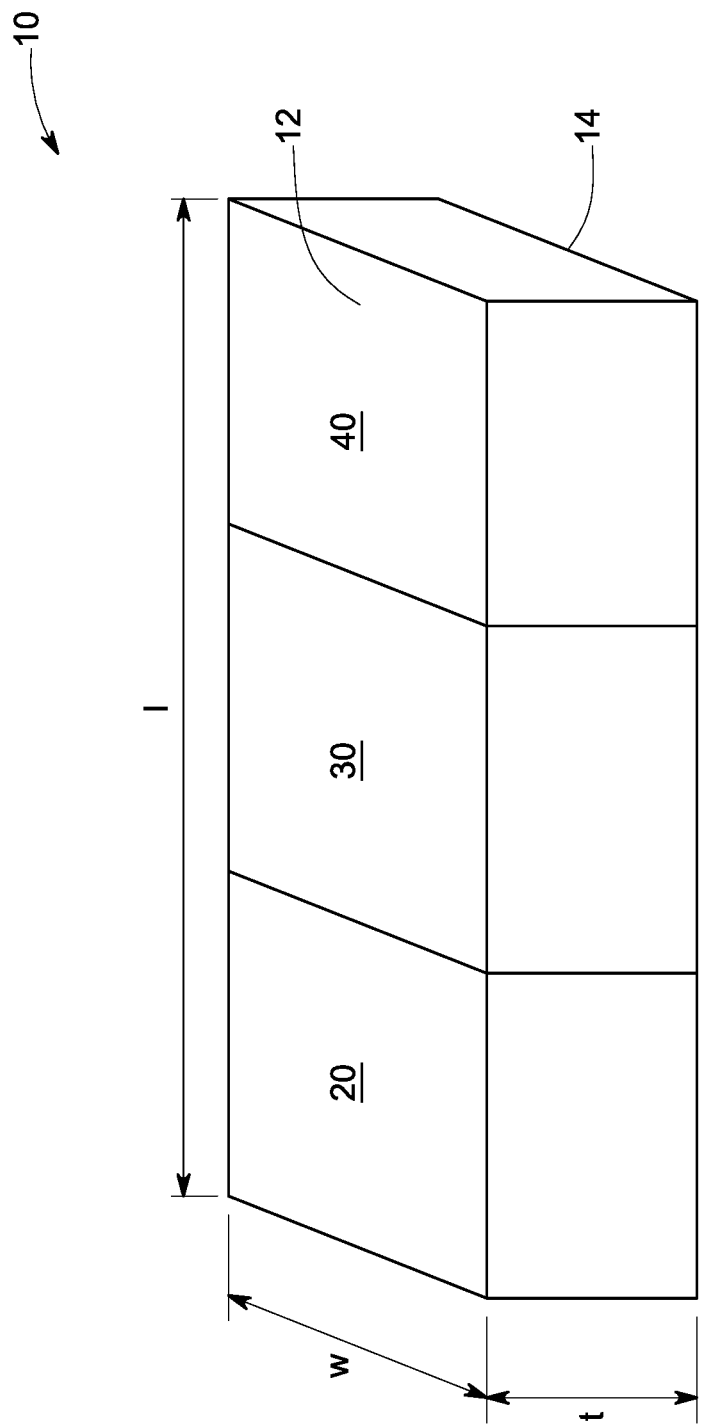
FIG. 3 illustrates a magnetic component including first, second, and third regions, in accordance with some embodiments.

Different embodiments of the present disclosure relate to a magnetic component having variations in nitrogen content and saturation magnetization in different regions of the magnetic component, and a method of varying the saturation magnetization in different regions of the magnetic component.

In some embodiments, a magnetic component is disclosed. The magnetic component described herein includes a first region and a second region, where the first region and the second region are characterized by a nitrogen content that is different from each other.

The term "magnetic component" as used herein refers to a magnetic part of any product, such as, for example, a rotor lamination of a motor. In some embodiments, the magnetic component is formed from a ferromagnetic material, in the size and shape required for the final application. FIG. 1 illustrates a magnetic component 10 in accordance with some embodiments. The magnetic component 10 is usually formed from a composition having a carbon concentration less than 0.05 weight %, and may be of any shape and size. For ease of understanding herein, the magnetic component 10 is envisaged as having a rectangular shape having a top surface 12 and a bottom surface 14.

In some embodiments, the magnetic component 10 may have a certain length (1), width (w), and thickness (t). The magnetic component 10 includes two marked regions, a first region 20 and a second region 30, where the first region 20 and the second region 30 are characterized by a nitrogen content that is different from each other. Further, at least one of the first region 20 and the second region 30 is partially-magnetic and has a nitrogen content in a range from about 0.1 weight % to about 0.4 weight % of that region.

Nitrogen content in a region is associated with a magnetism of that particular region. In some embodiments, the magnetism of a region increases with decreasing nitrogen content in that region. Thus, in some embodiments, a region is magnetic if a nitrogen content of that region is less than 0.1 weight % of that region, and a region is non-magnetic if a nitrogen content of that region is greater than 0.4 weight % of that region. Further, a region is partially-magnetic if a nitrogen content is in a range from about 0.1 weight % to about 0.4 weight % of that region.

As used herein, the term "magnetic region" refers to a region where greater than about 99 volume % of the region is magnetic. Further, the term "magnetic region" refers to a region having a relative permeability greater than 1. In some embodiments, the relative permeability of the magnetic region may be greater than 100, and in some embodiments, the relative permeability of the magnetic region may be greater than 200. In some embodiments, a saturation magnetization of the magnetic region is greater than 1.5 Tesla. In certain embodiments, a saturation magnetization of the magnetic region is greater than 1.8 Tesla.

As used herein, the term "non-magnetic region" refers to a region where greater than 90 volume % of the region is non-magnetic. Further, the term "non-magnetic region" refers to a region having a relative permeability approximately equal to 1. In some embodiments, a saturation magnetization of the non-magnetic region is about zero.

As used herein, the term "partially-magnetic region" refers to a region where from about 10 volume % to about 99 volume % of the region is magnetic with a relative permeability greater than 1. In some embodiments, a saturation magnetization of the partially-magnetic phase is in a region from about 0.01 to about 1.5 Tesla. In some embodiments, a saturation magnetization of the partially-magnetic region is in a range from about 0.5 to about 1.5 Tesla.

In some embodiments, the nitrogen content and saturation magnetization in a region are substantially constant across the volume within that region. For example, in some embodiments, a nitrogen content in a magnetic region has a substantially constant value that is less than 0.1 weight % and a saturation magnetization has a substantially constant value that is greater than 1.5 Tesla across the volume of the magnetic region. In some embodiments, a nitrogen content in a non-magnetic region has a substantially constant value that is greater than 0.4 weight % and a saturation magnetization is about zero across the volume of the non-magnetic region. Further, in some embodiments, a nitrogen content in a partially-magnetic region has a substantially constant value that is in a range from about 0.1 weight % to about 0.4 weight % and a saturation magnetization has a substantially constant value that is in a range from about 0.5 Tesla to about 1.5 Tesla across the volume of the partially-magnetic region.

In some embodiments, a nitrogen content of the first region 20 is less than 0.1 weight % of the first region 20, and a nitrogen content of the second region 30 is in the range from about 0.1 weight % to about 0.4 weight % of the second region 30. In some of these embodiments, the first region 20 is magnetic, and the second region 30 is partially-magnetic.

In some embodiments, a nitrogen content of the first region 20 is greater than 0.4 weight % of the first region 20, and a nitrogen content of the second region 30 is in the range from about 0.1 weight % to about 0.4 weight % of the second region 30. In some of these embodiments, the first region 20 is non-magnetic, and the second region 30 is partially-magnetic.

In some embodiments, a nitrogen content of the first region 20 has a substantially constant value in the range from about 0.1 weight % to about 0.4 weight % of the first region 20, and a nitrogen content of the second region 30 has a substantially constant value in the range from about 0.1 weight % to about 0.4 weight % of the second region 30, where the substantially constant values of the first region 20 and the second region 30 are different from each other. In some of these embodiments, both the first region 20 and the second region 30 are partially-magnetic, but are characterized by a nitrogen content that is different from each other.

A magnetic component, according to some embodiments, may include any number of first and second regions of any dimension and shape. In some embodiments, the magnetic component includes a plurality of first and second regions in the vicinity of each other.

FIG. 2 illustrates a magnetic component 10 in accordance with some embodiments of this disclosure. In some embodiments, as shown in FIG. 2, the magnetic component 10 may include a plurality of first and second regions. In the embodiment illustrated in FIG. 2, the first and second regions are illustrated as being disposed either adjacent to each other, or in an alternating manner. However, embodiments in which the first and second regions are disposed in a random manner throughout the volume of the magnetic component are also within the scope of the present specification. In some of these embodiments, two or more partially-magnetic regions may be disposed next to each other.

Referring again to FIG. 2, the magnetic component 10 includes a first portion 22 including a plurality of first regions 20 disposed adjacent to each other, a second portion 24 including a plurality of second regions 30 disposed adjacent to each other, and a third portion 25 including a plurality of first region 20 and second region 30 disposed in an alternating manner. In some embodiments, the plurality of first regions 20 in the first portion 22 may have similar relative permeability and saturation magnetization values. Similarly, in some embodiments, the plurality of second regions 30 in the second portion 24 may have similar relative permeability and saturation magnetization values.

Further, in some embodiments, a relative permeability of the first region 20 in the third portion 25 may be same as the relative permeability of the first region 20 in the first portion 22, and a saturation magnetization of the first region 20 in the third portion 25 may be same as the saturation magnetization of the first region 20 in the first portion 22. Furthermore, in some embodiments, a relative permeability of the second region 30 in the third portion 25 may be same as the relative permeability of the second region 30 in the second portion 24, and a saturation magnetization of the second region 30 in the third portion 25 may be same as the saturation magnetization of the second region 30 in the second portion 24.

In some other embodiments, a relative permeability of the second region 30 in the third portion 25 may be different from the relative permeability of the second region 30 in the second portion 24, and a saturation magnetization of the second region 30 in the third portion 25 may be different from the saturation magnetization of the second region 30 in the second portion 24. Further, in some embodiments, relative permeabilities of the plurality of second regions 30 in the second portion 24 may be same as, or different from one another, and saturation magnetization of the plurality of second regions 30 in the second portion 24 may be same as, or different from, one another.

In the present disclosure, a particular parameter (for example, nitrogen content, volume % of magnetic region, or a saturation magnetization) for two regions is stated to be different if a difference in the specified value between the two regions is at least 5% of the specified value of any one of the two regions. As used herein the term "difference" refers to a mathematical difference that would be obtained by subtracting a parameter value of one region (for example, the nitrogen content in the first region 20) from the parameter value of another region (for example, the nitrogen content in the second region 30). Thus, in some embodiments, a nitrogen content in the first region 20 and the nitrogen content in the second region 30 is said to be different if the nitrogen content of the first region 20 and the nitrogen content of the second region 30 have a mathematical difference of at least 5% of the nitrogen content of any one of the first region 20 and the second region 30. In some embodiments, the difference between the nitrogen contents of the first and second regions is greater than 10%.

In some embodiments, a saturation magnetization of the first and second regions is said to be different if the saturation magnetization of the first region 20 and the saturation magnetization of the second region 30 have a mathematical difference of at least 5% of the saturation magnetization of any one of the first region 20 and the second region 30. In some embodiments, the difference between the saturation magnetization of the first and second regions is greater than 10%.

It should be noted that FIGS. 1 and 2 are only for illustration purposes, and although the size and shape of the plurality of first and second regions is illustrated to be substantially similar, the shape and size of the regions may vary. For example, the first and second regions, or the first, second, and third portions illustrated in FIG. 2 need not always be along the length (1) of the magnetic component 10, or along the width (w), or thickness (t) of the magnetic component 10. The magnetic component 10 may be designed such that the different first regions 20 may have same or different shapes, length (l1), width (w1), and thickness (t1) values. For example, a shape (not specifically illustrated), length (l1), width (w1), and thickness (t1) of the first region 20 in the first portion 22 may be same as, or different from, the shape, length, width, and thickness respectively, of the first region 20 in the third portion 25.

Further, a shape (not specifically illustrated), length (l2), width (w2), and thickness (t2) of the second region 30 in the second portion 24 may be same as, or different from, the shape, length, width, and thickness respectively, of the second region 30 in the third portion 25. Furthermore, in some embodiments, a shape, length (l2), width (w2), and thickness (t2) of the plurality of second regions 30 in the second portion 24 may be same as, or different from, one another.

In some embodiments, the magnetic component 10 may further include a third region 40, as illustrated in FIG. 3. The third region 40 is characterized by a nitrogen content that is different from the nitrogen contents of the first and second regions. Thus, in some embodiments, a nitrogen content of the first region 20 is greater than 0.4 weight % of the first region, a nitrogen content of the second region 30 is in the range from about 0.1 weight % to about 0.4 weight % of the second region, and further a nitrogen content of the third region 40 is less than 0.1 weight % of the third region. In some of these embodiments, the first region is non-magnetic, the second region is partially-magnetic, and the third region 40 is magnetic.

In some embodiments, a nitrogen content of the first region 20 is less than 0.1 weight % of the first region, a nitrogen content of the second region 30 is in the range from about 0.1 weight % to about 0.4 weight % of the second region, and a nitrogen content of the third region 40 is greater than 0.4 weight % of the third region. In some of these embodiments, the first region 20 is magnetic, the second region 30 is partially-magnetic, and the third region 40 is non-magnetic. In some embodiments the partially-magnetic region 30 is disposed in between the magnetic region 20 and the non-magnetic region 40, as illustrated in FIG. 3.

Presence of regions of differential saturation magnetization such as magnetic, partially-magnetic, and non-magnetic regions in a motor component may enable precise control of magnetic flux distribution through the volume of an electrical machine. The magnetic flux density within the machine may be highest in magnetic regions, lower in the partially-magnetic regions, and lowest in the non-magnetic regions. Additionally, partially-magnetic and non-magnetic regions may aid in securing the high saturation magnetization regions together and retaining the mechanical integrity of the machine during operation. Further, the presence of multiple regions of different saturation magnetizations distributed throughout the volume of the machine may enable a machine designer to control distribution of magnetic flux within the machine.

In some embodiments, a nitrogen content of both the first region 20 and the second region 30 are in the range from about 0.1 weight % to about 0.4 weight % of the respective regions, where a nitrogen content in the first region 20 is different from the nitrogen content in the second region 30. Further, a nitrogen content of the third region 40 is greater than 0.4 weight % of the third region. In some of these embodiments, the first and second regions are partially-magnetic, and the third region 40 is non-magnetic. In some other embodiments, the first and second regions are partially-magnetic and the third region is magnetic.

A magnetic component 10, according to some embodiments, may have any number of first, second, and third regions of any dimension and shape, in any part of the magnetic component 10. In some embodiments, the first, second, and the third regions may be located adjacent to one another, or may be separated from one another. In some embodiments, the magnetic component may include a plurality of first, second and third regions, corresponding to magnetic, partially-magnetic, and non-magnetic regions respectively, where the partially-magnetic regions are disposed in between the magnetic and non-magnetic regions. In these embodiments, the magnetic and non-magnetic regions are separated from each other, and the partially-magnetic regions are adjacent to magnetic and non-magnetic regions.

In some embodiments, the magnetic component 10 may have a plurality of regions that include at least one partially-magnetic region. Other regions present in the plurality of regions may be magnetic, non-magnetic or partially-magnetic regions. For example, in some embodiments, the plurality of regions may include at least one partially-magnetic region, and at least one magnetic region. In some embodiments, the plurality of regions may include at least one partially-magnetic region, and at least one non-magnetic region. In some embodiments, the plurality of regions may include at least two partially-magnetic regions. In some embodiments, the magnetic component may include at least one magnetic region, at least one partially-magnetic region, and at least one non-magnetic region, as discussed earlier. In some embodiments, the magnetic component 10 is in a monolithic form. As used herein the term "monolithic form" refers to continuous structure substantially free of any joints. In some embodiments, the monolithic magnetic component may be formed as one structure during processing, without any brazing or multiple sintering steps. When the magnetic component is made using a single material, the negative effects of bonding different regions are reduced by ensuring reliability, hermeticity, and increased bond strength of the magnetic component 10.

In some embodiments, a monolithic magnetic component may be manufactured by additive manufacturing. In some embodiments, a magnetic component is manufactured as a monolithic structure, prior to any sintering step. In certain embodiments, the monolithic magnetic component in its entirety is manufactured using a powder having the same composition as the starting material.

Thus, in some embodiments, the magnetic component 10 may be prepared from a single material. As an example, the magnetic component may be prepared from a starting material including a magnetic material. The magnetic material used herein may be a single element, an alloy, a composite, or any combinations thereof. In some embodiments, the magnetic component may include an iron-based alloy in both the first region 20 and the second region 30.

As disclosed earlier, in some embodiments, a nitrogen content in a region within a magnetic component is associated with a magnetism of that particular region. In some embodiments, an association of magnetism of a region with the nitrogen content in that region may vary depending on the composition of the alloy used to form the magnetic component, due to the difference in nitrogen solubility as determined by alloy composition. Thus, in some embodiments, a maximum nitrogen content that can be included in a magnetic region for one ferrous alloy may be different from the maximum nitrogen content that can be included in a magnetic region of another ferrous alloy of different composition. Further, the range of nitrogen contents that may be included to form the partially-magnetic regions in the two ferrous alloys of different compositions may be different and a minimum nitrogen content that can be included to form a non-magnetic region in two different ferrous alloys may vary depending on the compositions of the two ferrous alloys.

In some embodiments, the iron-based alloy may further include chromium, manganese, or a combination thereof. In some embodiments, the iron-based alloy may have a ferrite or martensitic structure. In some embodiments, the iron-based alloy has a composition of 20 weight % chromium and 5 weight % manganese with the balance being substantially iron. In some embodiments, the chromium and manganese concentrations may be between 14 and 20 weight % and between 2 and 5 weight %, respectively, with the balance being iron. In some embodiments, part of the iron may be substituted with up to 35 weight % cobalt. In some embodiments, part of chromium may be substituted with up to 8 weight % aluminum. In some embodiments, part of the iron may substitute with up to 35 weight % cobalt and part of chromium may be substituted with up to 8 weight % aluminum. In some embodiments, the magnetic region of this alloy has a nitrogen content less than 0.1 weight % of that region, a non-magnetic region has a nitrogen content that is greater than 0.4 weight % of that region, and a partially-magnetic region has a nitrogen content in a range from about 0.1 weight % to about 0.4 weight % of that region. As discussed previously, conversion of ferrite or martensitic structures into an austenite increases non-magnetic and partially-magnetic phases in this alloy.

Austenite, also known as gamma phase iron (γ-Fe), is a metallic, paramagnetic allotrope of iron. Heating the iron, iron-based metal, or steel to a temperature at which it changes crystal structure from ferrite to austenite is called austenitization. In some embodiments, austenitization may be carried out by adding certain alloying elements. For example, in some embodiments, addition of certain alloying elements, such as manganese, nickel, and carbon, may stabilize the austenitic structure even at room temperature. A selected region may be made partially-magnetic by stabilizing austenite at room temperature at parts of the selected region. Further, a multi-phase magnetic component may be formed by stabilizing austenite at room temperature, in some regions of the magnetic component, while retaining some of the strongly ferromagnetic martensite or ferrite phases at some other regions of the magnetic component.

The presence of carbon is known to stabilize the non-magnetic austenite structure. Earlier efforts had been directed at dissolving formed carbides in selected regions of the magnetic component to stabilize non-magnetic phases at those regions of the magnetic component. In some embodiments, a partially-magnetic region of the magnetic component is formed by stabilizing a low permeability austenite structures, by the addition of nitrogen, rather than carbon. Carbides, as second phases, are known to be undesirable for the magnetic component. Thus, in some embodiments, the magnetic component is substantially free of carbon.

However, in other embodiments of the disclosure, the magnetic component may contain a relatively small level of carbon, which can sometimes increase the tensile strength of the magnetic component. In these embodiments, the total amount of carbon in all regions of the magnetic component may be less than about 0.05 weight %. In some embodiments, as described above, the magnetic component 10 has a first region and a second region, where the first region and the second region are characterized by a nitrogen content that is different from each other. In some embodiments, a concentration of carbon in the first region 20 and the second region 30 of the magnetic component 10 is less than 0.05 weight % of that respective region.

In some embodiments, a method of manufacturing a magnetic component 10 is disclosed. Thermodynamic and empirical calculations may be used to predict magnetic component 10 compositions that upon the addition of nitrogen at elevated temperatures to form the austenite phase. A magnetic component 10 using the designed alloy composition may be manufactured by using the traditional methods. In some embodiments, the magnetic component thus manufactured, in a near-final form, is subjected to selective nitriding, without the need to substantially alter the shape and size of the formed magnetic component after nitriding. As used herein the term "selective nitriding" is the controlled nitriding of some (desired) regions of the magnetic component, without substantially altering the ferromagnetic nature of the nearby regions. The ferromagnetic nature of a nearby region may be considered to be "substantially altered", if the average saturation magnetization of that region is reduced by more than about 5 volume % of that region.

The magnetic component may be engineered to have nitrogen solubility, prior to nitriding, and regions of different saturation magnetization may be realized by selective nitriding. The saturation magnetization of the final magnetic component may be a fraction of the saturation magnetization of the magnetic component before the step of nitriding. The saturation magnetization may differ throughout the volume of the final magnetic component due to localized variations in the processing conditions of the material.

The selective nitriding of the magnetic component may be attained by using different methods of nitriding. A chemical, physical, or mechanical block may be provided to the regions of the magnetic component where the nitriding is not desirable, to retain the magnetism. For example, a chemical composition that discourages nitrogen diffusion into the magnetic component may be used as the "nitrogen stop-off" material at some regions. A physical method of selectively introducing the nitrogen at selected regions, while making the nitrogen unavailable for the other regions, may be used. A mechanical block may be able to mechanically prevent the diffusion of the nitrogen at certain regions.

Thus, in some embodiments, a method of varying the (saturation) magnetization values in different regions of a magnetic component is presented. The method includes disposing a coating that includes a nitrogen stop-off material on at least one portion of the component to form a mask, and heat-treating the component in a nitrogen-rich atmosphere to form the first and second regions. The temperature of heat-treatment may be greater than 700° C. As used herein the term "nitrogen stop-off material" refers a material that is capable of substantially stopping the nitrogen from entering into that region. It is not necessary that the stop-off material itself contain nitrogen. As the method includes selective introduction of nitrogen to first and second regions, the first region and the second region are characterized by a nitrogen content that is different from each other. Further, the introduction of nitrogen to the first and second regions is controlled such that at least one of the first and second regions is partially-magnetic and has a nitrogen content in a range from about 0.1 weight % to about 0.4 weight % of that region.

In some embodiments, a stencil may be used over the magnetic component to block some regions and expose other regions for the coating of nitrogen stop-off material. The coating material may be disposed on the magnetic component by using different methods. Non-limiting examples of methods for disposing the coating on the magnetic component may include dip coating, spray coating, spin coating, slip casting, tape casting and lamination, and gel casting. In certain embodiments, the coating is disposed by spray coating a nitrogen stop-off material in a slurry form over the magnetic component.

In some embodiments, regions that are designed to be partially-magnetic are masked by the coating such that a controlled, partial diffusion of nitrogen is permitted. In some embodiments, regions that are designed to be magnetic are masked such that nitrogen diffusion to those regions is avoided. Further, in some embodiments, the regions that are designed to be non-magnetic remain unmasked such that nitrogen diffuses into those regions.

Thus, by way of example, if it is desired that the first region of the magnetic component is magnetic and have nitrogen content less than 0.1 weight %, the second region is partially-magnetic with the nitrogen content in a range from about 0.1 weight % to about 0.4 weight %, and the third region is non-magnetic with the nitrogen content greater than 0.4 weight %, the coating may be disposed on the first region and the second region. It should be noted that to achieve a partially-magnetic region, a coating may be disposed on that particular region similar to the magnetic region, however, a coating parameter may be varied to achieve the desired nitrogen levels.

Therefore, in some embodiments, the difference in nitrogen content of the first region 20 and the second region 30 of the magnetic component 10 is achieved by varying a coating parameter. The coating parameter includes, but is not limited to, one or more of a coating thickness, a coating density, and a surface coating area percentage. The variation in these coating parameters may be achieved by different methods. In some embodiments, the coating parameters may be varied by controlling a deposition parameter used for disposing the coating. Suitable deposition parameters, include, but are not limited to, deposition methods, material composition, solid loading, density, thickness of as-deposited coating, speed of deposition, drying methods, drying speed, sintering temperature, time, and coating atmosphere. For example, in certain embodiments, difference in nitrogen content of the first region and the second region is achieved by disposing a coating having a variable thickness. Thus a thickness of the coating in the first region may be varied from the thickness of the coating in the second region, during the deposition itself, so that the nitrogen diffusion into the magnetic component through the masked surface is different in the first and second regions.

Figure 4:
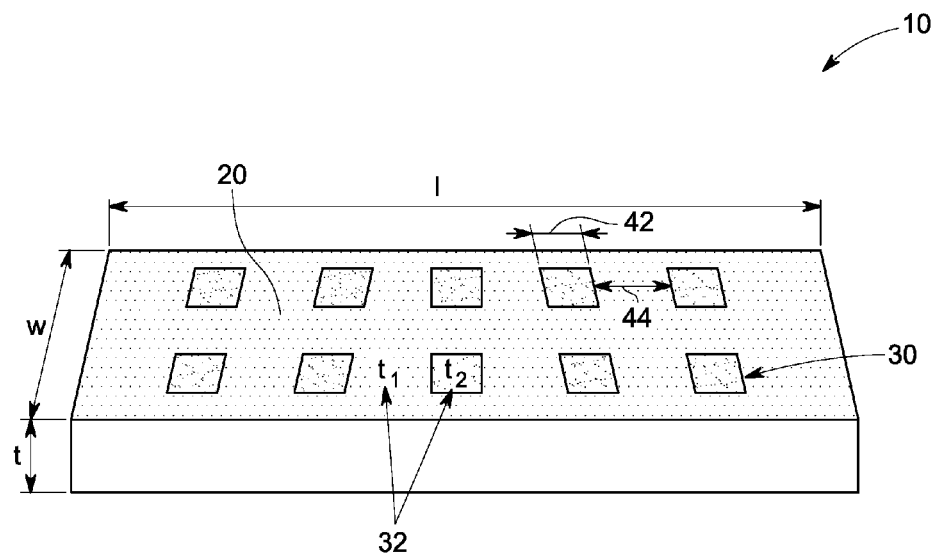
FIG. 4 illustrates a configuration of masks in a magnetic component, that may be used by the methods described herein, in accordance with some embodiments.

In some embodiments, as illustrated in FIG. 4, the first and second regions of the component 10 are masked such that a portion of the magnetic component 10 corresponding to first region 20 is masked by a coating 32 with a thickness t1 to stop the nitrogen diffusion, and a portion of the magnetic component 10 corresponding to the second region 30 is masked by the coating 32 with a lower thickness t2, such that a calculated amount of nitrogen is permitted to diffuse into the second region 30. In these embodiments, the first region 20 is designed to be magnetic, and the second region 30 is designed to be partially-magnetic.

In some embodiments, the thickness t2 of the coating 32 may be controlled such that different portions of the second region 30 have different nitrogen level and different volume % of magnetic regions upon nitriding.

Figure 5:
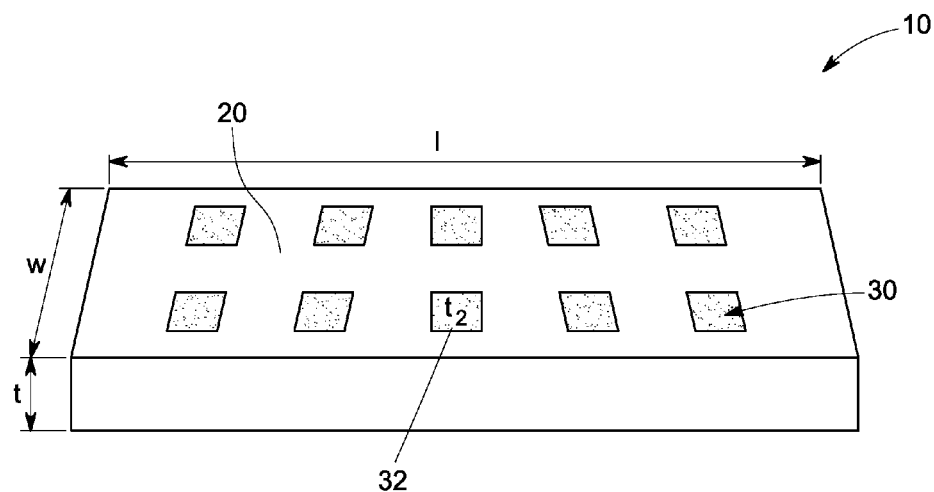
FIG. 5 illustrates a configuration of masks in a magnetic component, that may be used by the methods described herein, in accordance with some embodiments.

Turning now to FIG. 5, in some embodiments, a mask of the nitrogen stop-off material on the magnetic component may be designed such that a portion of the magnetic component 10 corresponding to the first region 20 is unmasked and a portion of the magnetic component 10 corresponding to the second region 30 is masked with the coating 32 of a thickness t2. The unmasked portion permits the nitrogen to diffuse through the magnetic component 10, making the first region 20 non-magnetic, and the masked portion with the coating 32 of thickness t2 allows a partial diffusion of the nitrogen, thus rendering the second region 30 partially-magnetic. One skilled in the art would understand that depending on the shape and size of the required magnetic, partially-magnetic, and non-magnetic regions, the masks may be designed to have different shapes and characteristics.

As discussed above, in some embodiments, instead of varying thickness of the coating, a density or surface coating area percentage of the coating may be varied to control the diffusion of the nitrogen. For example, a coating having a lower density may allow higher amount of nitrogen to diffuse through, as compared to a dense coating. Further, if a surface coating area percentage (alternately percentage of area covered by the coating) of the first region 20 is lower than a surface coating area percentage of the second region 30, a greater amount of nitrogen may diffuse in to the first region 20. In some embodiments, the difference in nitrogen content of the first region 20 and the second region 30 is achieved by selectively removing portions of the coating in one of the regions before the step of heat-treating, thus varying the surface coating area percentage or density of the coating in those regions. Portions of the coating may be selectively removed by different methods including, but not limited to, etching and grit blasting.

As noted earlier, in some embodiments, both the first region 20 and the second region 30 may be partially-magnetic. In such embodiments, the two regions may be formed in the magnetic component for example, by disposing coatings of different thickness, density, or surface coating area percentage in the first and second regions, or by selectively removing the coating partially in one of the regions. In certain embodiments, the magnetic component 10 may include three different regions, such that the first region 20 is magnetic, the second region 30 is partially-magnetic, and the third region 40 is non-magnetic, as shown in FIG. 3. In these embodiments, the first region may be masked with a coating having the desired thickness, density, and surface area coverage that the nitrogen is blocked from entering into the first region. The second region may be partially blocked by varying one or more of the thickness, density, and surface coating area percentage of a coating, to permit the desired amount of nitrogen diffusion into the second region 30. The third region may be completely uncoated to allow maximum nitrogen diffusion into the third region 40. Thus, in such embodiments, the nitridation may be controlled such that the first region 20 has a nitrogen content less than 0.1 weight % of the first region 20, the second region 30 has a nitrogen content in a range from about 0.1 weight % to about 0.4 weight % of the second region 30, and the third region 40 has a nitrogen content greater than 0.4 weight % of the third region 40. Further, a concentration of carbon in the first, second, and third regions may be controlled to be less than 0.05 weight % of the respective regions.

Nitriding may be carried out through a solid, liquid, gaseous, or plasma route. In some embodiments, elevated temperature gas nitriding is used to introduce nitrogen to the part. In certain embodiments, the elevated temperature gas nitriding includes heat-treating the magnetic component in a nitrogen atmosphere at an elevated temperature. Alternately, heat treatment in a mixture of ammonia and hydrogen may be used for nitrogen diffusion. The elevated temperatures in this technique allow for fast diffusion of nitrogen, providing a quick processing route. In some embodiments, heat treatment in a molten salt bath containing cyanides, cyanates, or a combination thereof may be used for nitrogen diffusion. In some embodiments, plasma nitriding may be used for the nitrogen diffusion.

In some embodiments, nitrogen may be diffused into the magnetic component 10 through gas nitriding in a nitrogen-rich atmosphere, by heat-treating at a temperature greater than 700 degree Celsius (° C.). In some embodiments, gas nitriding is conducted by heat-treating at a temperature greater than 800° C.

In some embodiments, pressure used for gas nitriding is greater than 0.5 atmospheres (atm.). Generally, the diffusion of nitrogen is expected to increase with a higher heat-treatment temperature, and an increased equilibrium surface concentration of nitrogen. The increased pressure of the gases surrounding the magnetic component 10 often leads to an increased surface concentration of nitrogen. Therefore, at a given condition in a pure nitrogen atmosphere, a nitrogen pressure greater than the atmospheric pressure and a high temperature will generally provide a faster nitriding process. In some embodiments, an ambient pressure of greater than 1 atm. and a temperature greater than about 900° C. is used for nitriding. In a further embodiment, the temperature of nitriding is greater than 1000° C.

In some embodiments, a nitrogen-rich atmosphere is used for nitriding. In some embodiments, the nitrogen-rich atmosphere includes greater than 90% of nitrogen. In some embodiments, nitriding is conducted in a substantially pure nitrogen atmosphere. The substantially pure nitrogen atmosphere may be created by filling nitrogen in a furnace cavity after evacuating the air from the furnace cavity, and purging with nitrogen or through the continuous flow of nitrogen during processing. The coating may be applied on the component depending on the desired pattern of nitrogen diffusion (and non-diffusion) for the magnetic component 10. For example, in FIG. 6, the coating 32 with thickness t1 is disposed on all surface portions of the magnetic component 10 corresponding to the different first regions 20, and the surface portion of the second region 30 is partially coated with the coating 32 having a thickness t2 that is less than t1.

Figure 7:
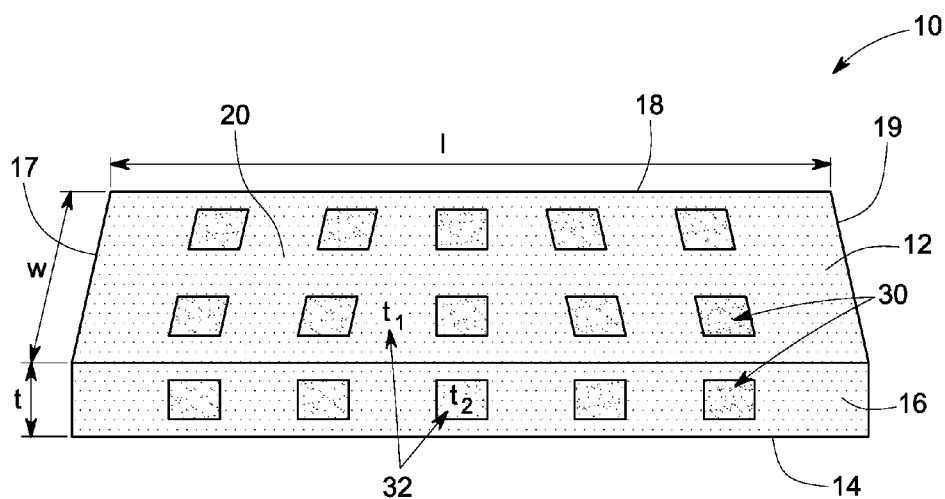
FIG. 7 illustrates a configuration of masks in a magnetic component, that may be used by the methods described herein, in accordance with some embodiments.

The coating 32 with the lower thickness t2 is designed to permit partial diffusion of nitrogen during nitriding. The coating 32 with thickness t2 corresponding to the second region 30 is disposed on the top surface 12 and the bottom surface 14 (coating is not explicitly shown in the bottom surface 14) portions. In these embodiments, the nitridation of the magnetic component 10 occurs only through the partially coated surface portions of the second region 30 on the top surface 12 and the bottom surface 14. Turning now to FIG. 7, the front and back surfaces 16 and 18 through the thickness t of the magnetic component 10 further include partially coated surface portions of the second regions 30, and hence the nitridation of the magnetic component 10 in FIG. 7 may occur through the surface portion of the second regions 30 on the top 12, bottom 14, and the front 16 and rear 18 surface portions of the magnetic component 10.

When the magnetic component 10 illustrated in FIG. 7 is subjected to gas nitriding, the nitrogen diffuses through the component, through uncoated, if any, and partially coated portions of all the faces of the component 10, including the top surface 12, bottom surface 14, and side surfaces 16, 17, 18 and 19 of the magnetic component. This diffused nitrogen, in conjunction with the composition of the magnetic component, changes the local phase stability in those regions, and converts those regions into non-magnetic austenite. Even though the nitrogen diffuses through the surface, the nitriding parameters allow the nitrogen to diffuse further into the length, width, and thickness of the magnetic component, through all the surfaces of the magnetic component 10, while the masked or partially masked regions prevent substantial nitrogen diffusion through those regions.

Through empirical and thermodynamic calculations, the parameters of nitriding may be adjusted, and the nitrogen diffusion at different directions may be predicted for certain regions of the magnetic component 10, and accordingly, the mask size and shape may be altered so that the end product obtained is approximately the desired outcome of the nitriding process.

Figure 6:
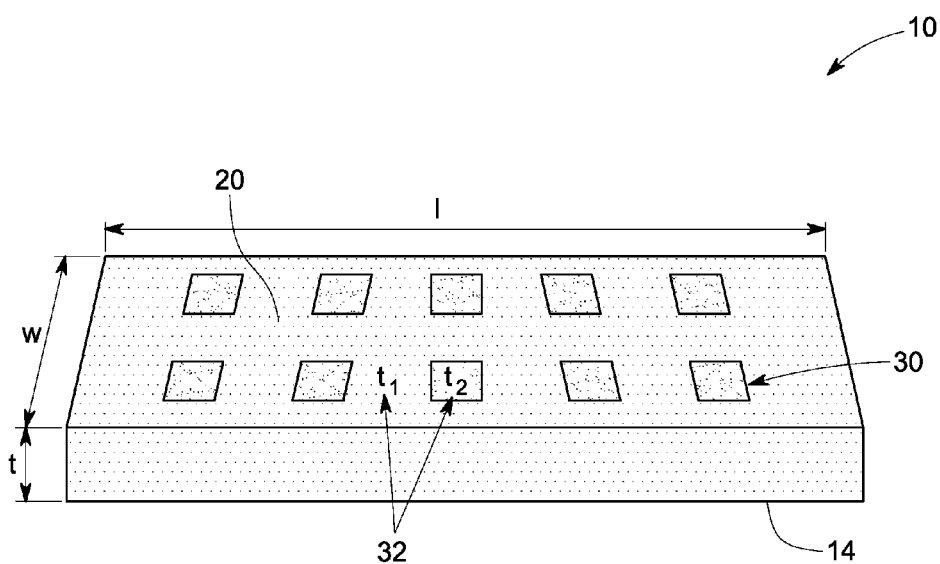
FIG. 6 illustrates a configuration of masks in a magnetic component, that may be used by the methods described herein, in accordance with some embodiments.

In some embodiments, the nitrogen diffusion into interior regions of the magnetic component may depend on the distance nitrogen travels inside the magnetic component 10. For example, if the nitridation is only through the top and bottom surfaces 12, and 14 respectively, as shown in FIG. 6, the time duration required for the nitrogen diffusion into the inner parts of the magnetic component 10 may depend on the thickness t of the magnetic component 10. In some embodiments, the thickness of the magnetic component 10 is in a range from about 0.1 mm to about 5 mm. The desired pattern of the magnetic, non-magnetic, and partially-magnetic regions of this component may be obtained by diffusing the nitrogen through the selectively masked top surface 12 and bottom surface 14, keeping the side surfaces of the thickness t completely masked.

Width 42 (as shown in FIG. 4) of the mask of the partially-masked second region 30 is the dimension between first regions 20, and may be designed as per the requirement of the magnetic component 10. In some embodiments, a width 44 of each of the first regions 20 in the surface is greater than about 0.5 mm. In a further embodiment, a width of each of the first regions 20 in a plane perpendicular to the thickness t is greater than about 0.5 mm. (As previously explained in FIG. 1, the dimension "w" represents the overall width of the magnetic component 10.)

Figure 8:
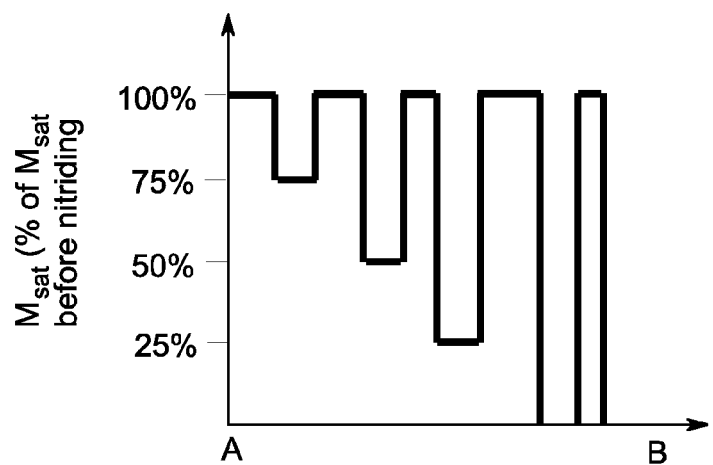
FIG. 8 schematically illustrates saturation magnetization values of a multi-phase magnetic component that may be obtained, in accordance with some embodiments.

FIG. 8 schematically illustrates a hypothetical variation of saturation magnetization ($M_{Sat}$) of a portion of magnetic component 10 along a direction from A to B. As used herein, the saturation magnetization $M_{Sat}$ of particular regions are presented as a percentage of the saturation magnetization of that particular region before nitriding.

Depending on the applications, the shape of the magnetic, partially-magnetic, and non-magnetic regions may vary, and the diffusion of nitrogen may be designed to satisfy these requirements. Accordingly, in some embodiments, a volume percent of the partially-magnetic region in the surface and interior portions of a magnetic component 10 is equal to or greater than the volume percent of the magnetic or non-magnetic regions in the surface and interior portions. In some embodiments, partially-magnetic regions of the magnetic component have an interconnected geometry, regardless of the difference in saturation magnetization of different portions of the partially-magnetic region. The "interconnected geometry" as used herein implies that a region is connected all through the component, and is hence not isolated completely from the similar regions, being surrounded by the other regions completely.

Different topologies may include multi-phase magnetic materials described above and an electrical machine including a magnetic component as described above may be manufactured. For example, internal permanent magnet machines, and induction machines may be designed with higher power density and improved power factor, and reduced torque ripple through pole shaping, and may be designed to have sensorless control. Switched reluctance machines may be designed to have lower windage losses at high speeds and further to reduce torque ripple. Synchronous reluctance machines may be designed to have higher power density, improved power factor, wider constant power speed range, lower torque ripple, and sensorless control.

Figure 9:
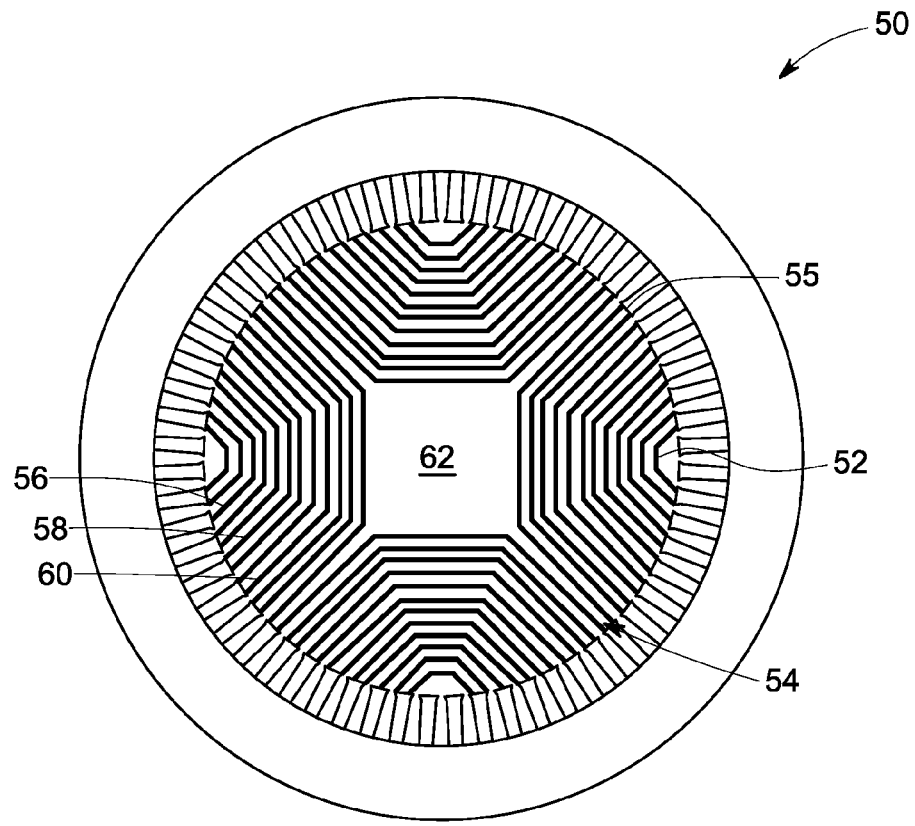
FIG. 9 illustrates a cross-sectional view of a multi-phase component prepared using the methods described herein, in accordance with some embodiments.

For example, a number of different types of synchronous reluctance machines, including a stator and a rotor shaft operationally disposed within the confines of the stator may be designed. FIG. 9 illustrates an example of a topology that could benefit from the multi-phase materials. The component 50 can represent a portion of the reluctance machine, including a magnetic region 52 and a partially-magnetic region 54, collectively referred to as "laminated segments" below. The selectively shaped rotor 55 of the component 50 is configured as a four-pole machine. Each pole can include a plurality of the axially-extending, radially positioned ("stacked") laminated segments 56, 58, 60, and the like, which extend from each pole, terminating at a central rotor shaft 62. The number of poles, and the number of laminations, can vary greatly, depending on the particular design of the reluctance machine.

With continued reference to FIG. 9, the laminated segments effectively guide the magnetic flux into and out of the rotor 55. The magnetic regions 52 constrain the path of the magnetic flux, while the partially-magnetic regions 54 ensure a relatively high density of magnetic flux lines coming out of the surface of the rotor, and going into an air gap between the rotor and the stator. In manufacturing these types of reluctance machines according to conventional techniques, magnetic and partially-magnetic laminations usually had to be assembled by various mechanical/metal-working steps, e.g., cutting and welding. Inventors of the present application have discovered that the desired configurations of the machines obtained much more efficiently using the multi-phase materials and methods for making these, as described in some embodiments.

Different embodiments presented herein may enable a motor designer to precisely control the distribution of magnetic flux through the volume of an electrical machine. This may be achieved by designing regions of differential saturation magnetization distributed throughout the volume of the machine. The magnetic flux density within the machine will be high in those regions which have higher saturation magnetization. Regions of lower saturation magnetization will still be available to retain the mechanical integrity of the machine. Thus, in some embodiments, the low magnetization regions may be used to fasten together the high saturation magnetization regions during rotation of a machine in operation.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A magnetic component, comprising:
 a first region, a second region, and a third region, wherein the first region comprises a magnetic phase, the second region comprises a saturation magnetization in a region from about 0.01 Tesla to about 1.5 Tesla, and the third region comprises a non-magnetic phase;
 the first region has a nitrogen content less than 0.1 weight % of the first region, the second region has a nitrogen content in a range from about 0.1 weight % to about 0.4 weight % of the second region, and the third region has a nitrogen content greater than 0.4 weight % of the third region; and
 a concentration of carbon in the first, second, and third regions is less than 0.05 weight % of the respective regions.

2. The magnetic component of claim 1, wherein the first region, the second region, and the third region comprise an iron-based alloy.

3. The magnetic component of claim 2, wherein the iron-based alloy further comprises chromium, manganese, or a combination thereof.

4. The magnetic component of claim 1, wherein the magnetic component is in a monolithic form.

5. An electric machine, comprising the magnetic component of claim 1.

* * * * *